Figure 1:
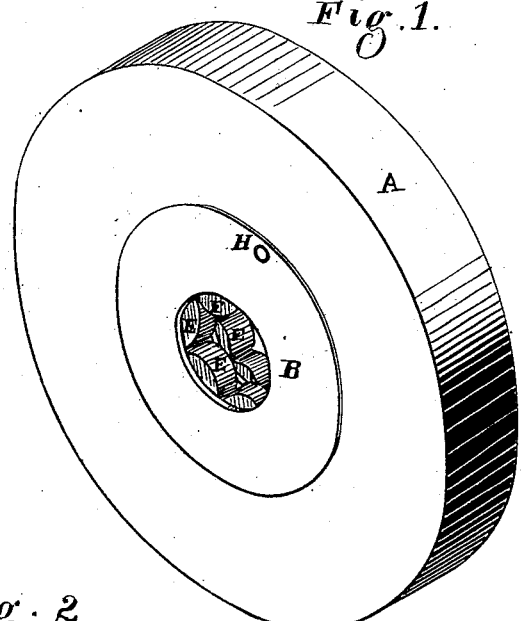

3 Sheets—Sheet 1.

T. H. KING.
Anti-Friction Bearing for Journals and Axles.

No. 202,034. Patented April 2, 1878.

Witnesses.
Geo. H. Strong
Frank A. Brooks

Inventor
Thomas Henry King

3 Sheets—Sheet 2.

T. H. KING
Anti-Friction Bearing for Journals and Axles.

No. 202,034. Patented April 2, 1878.

Witnesses
Geo. H. Strong.
Frank A. Brooks.

Inventor
Thomas Henry King

3 Sheets—Sheet 3.

T. H KING.
Anti-Friction Bearing for Journals and Axles.

No. 202,034.     Patented April 2, 1878.

WITNESSES:
C. Clarence Poole
R. K. Evans

INVENTOR:
Thos. Henry King
by A. H. Evans & Co
attys.

UNITED STATES PATENT OFFICE.

THOMAS H. KING, OF SAN FRANCISCO, CALIFORNIA.

IMPROVEMENT IN ANTI-FRICTION BEARINGS FOR JOURNALS AND AXLES.

Specification forming part of Letters Patent No. 202,034, dated April 2, 1878; application filed February 2, 1878.

*To all whom it may concern:*

Be it known that I, THOMAS H. KING, of the city and county of San Francisco, and State of California, have invented an Anti-Friction Bearing for Shafts and Axles; and I do hereby declare the following to be a full, clear, and exact description thereof, reference being had to the accompanying drawings.

My invention relates to an improved construction for the bearings of shafts, axles, or journals of pulleys, wheels, sheaves, and other devices where it is necessary or desirable to reduce the friction between the surfaces which move in contact.

It consists in the employment of a novel combination of anti-frictional rollers, peculiarly arranged in alternate series within a case or box, guided by central pins bearing against rims in the bushing and surrounding the axle, shaft, or pin, so that the friction between the shaft and its surrounding box is reduced to that of rolling contact, and without the wear and abrasion between the rollers which attend the use of the ordinary anti-friction rollers.

The use of what are termed "anti-friction rollers" for journals is well known, and has its widest practical use in sheaves or pulley-blocks. Anti-frictional rollers, as constructed heretofore, have been held in relative position apart, following each other in single line, making but one system or set to each bearing, and they are secured in position at each end by projections from a band, which band is secured by a rivet or screw to a corresponding band at the opposite end of the roller, thus holding the rollers in single file surrounding the pin, shaft, or axle. The objections to this system are manifold, being, first, when a roller passes from bearing on the pin, axle, or shaft, it does so with a shock, noise, or abrasion proportionate to the strain upon it, and the next roller, striking the shaft, causes it to recede before getting under pressure. This causes great friction and pounding, by which the ends of the rollers are elongated, and by such excessive abrasion thus soon wear out.

When, as in a sheave, the pin is of approximately the size of the rollers, its lodgment between the rollers so far from its center of bearing causes it to act as a wedge and prevent the rollers from revolving. This action causes the rollers to become worn, and their cylindrical shape is destroyed, while the excessive abrasion, even if they do not lose their shape, wears them small, elongates them, and reduces the ends, so that they will be forced over the necessarily narrow flanges between which they run by the slightest lateral sway or uneven rotation of the wheel.

My invention contemplates the employment of two or more systems of rollers, so placed and held in their relative positions that when they revolve about the shaft, axle, or pin they will alternate in their bearing upon it, and by a novel means the rollers are held in their relative positions by means of an intervening annulus between the sets of rollers, said annulus having pins projecting from its opposite sides alternately with each other, and used either with or without a corresponding frame to support their outer ends.

It further consists in providing, either on the axle, pin, or shaft, or hub, bushing, or box, or both, a flange or lip corresponding with an intervening moving annulus, and this flange acts as a thrust-bearing for the rollers when they are acted upon by the lateral sway or wabbling of the wheel, and also so as to protect the moving annulus from friction and wear by the rollers.

My invention further consists in making the depth of the bushing and bearing greater than that of the sheave, so that the plane of the faces of the bushing lies outside the plane of the faces of the sheave. This provides a steadying central bearing against the shell of the block, to prevent the sheave wabbling, and at the same time keep the faces of the sheave out of contact with the shell.

Figure 2:
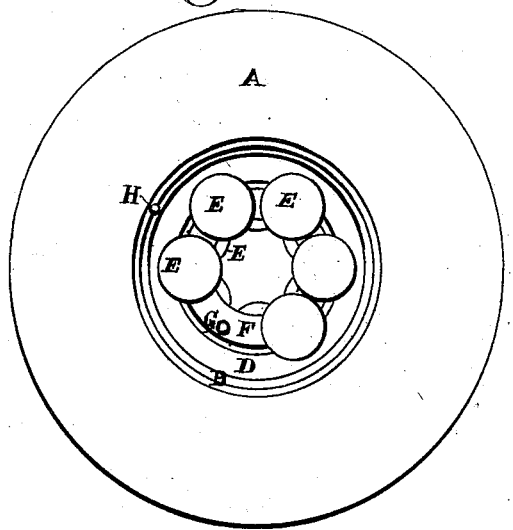
Figure 3:
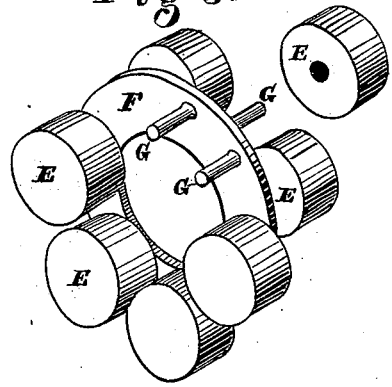
Figure 4:
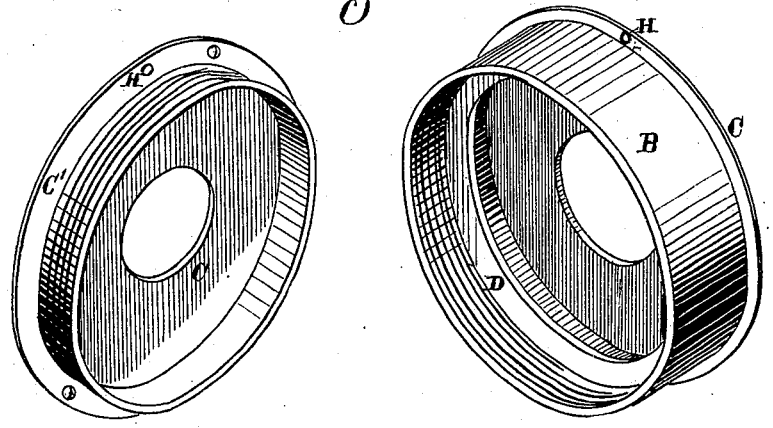

Referring to the accompanying drawings for a more complete explanation of my invention, Figure 1 is a side view of a wheel or pulley containing my anti-frictional mechanism. Fig. 2 is a view showing one side of the case and one roller removed. Fig. 3 is a view of the rollers mounted upon their supporting-frame. Fig. 4 is a view of the inclosing case or box. Figs. 5, 6, 7, and 8 show obvious modifications of my device.

A is a pulley or wheel which I have used to illustrate my invention. Within this wheel is fitted a bushing or box, B, of sufficient size to contain the rollers and the shaft or axle. This bushing or box extends through the wheel, and has flanges C C' upon each side, projecting a little outside of the rim, and inwardly so as to nearly conceal the rollers, and leave just space enough for the shaft to revolve and clear the flanges. One of these flanges is cast with the box, while the other has a rim cast with it, and this rim has screw-threads cut upon its exterior, so as to screw into the box B, as shown, while its interior serves as a bearing for one or both sets of rollers. A flange, D, projects toward the center from a point midway between the end flanges of the box B, and this flange serves as a thrust-bearing, as will be hereinafter explained. Within the box B are two or more sets of rollers, E. These rollers are mounted as follows: An annular ring, F, is formed, having a number of pins, G, projecting from each side to receive the rollers. These pins stand so that those upon one side alternate with those upon the opposite side, as shown, and the device may be very economically formed by the use of drop-dies, or cast and milled.

The rollers E have holes drilled into their centers from one side, extending far enough to give them a proper support and keep them separate, but not extending entirely through. One set of these rollers is then placed into the compartment which is formed by the permanent flanges C and D of the box, and the ring F is then placed so that the pins upon one side enter the holes in the rollers. The other set of rollers is then placed upon their pins, and the removable flange C' is screwed into its place, thus inclosing the whole, and when screwed up close the projecting portions of the flanges C fit into counterbored depressions which are formed in the wheel. The outer faces of these flanges are beveled on their edges, and their planes project just enough beyond the sides of the pulley to form a central side bearing, which serves to steady the pulley when it is to be used in a block or similar position. The bushing or box needs no other security save a simple pin, H, which serves as a key to prevent the sections from unscrewing, and in a wood sheave or wheel prevents the bushing rotating in the wheel.

By my construction it will be seen that the shaft passing through the center will be supported at all times upon three of the rollers, and the distance between the tops of these rollers being only a small part of what it would be if the rollers were coincident through the bearing, the pounding or abrading action of the shaft will be reduced to a minimum.

The central flange D acts as a thrust-bearing to receive the end thrust of the rollers which may be produced by the side strain or motion of the wheel or pulley, and the greater depth of the flanges C which is made possible by my construction prevents the rollers from overriding, as they would when worn with a narrower flange.

Figure 5:
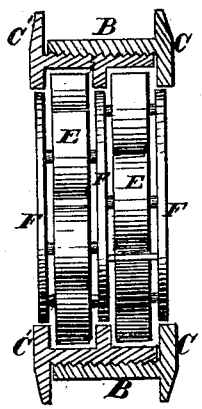
Figures 6, 7:
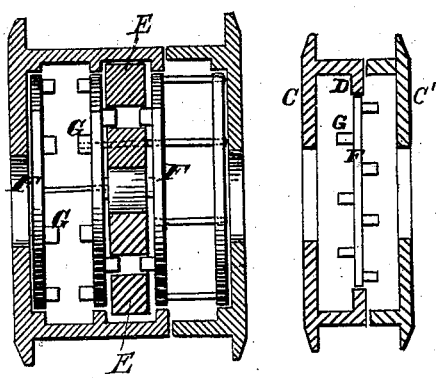
Figure 8:
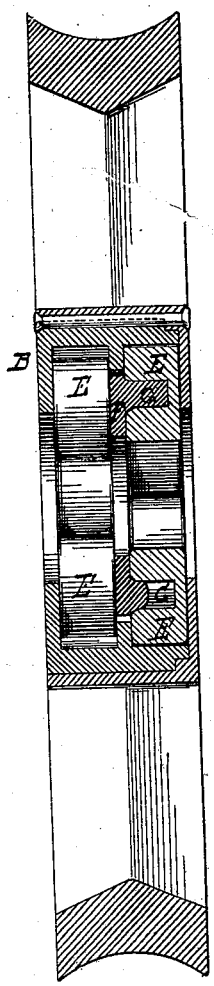

Various modifications of my device will suggest themselves, one of which is shown in Figs. 5, 6, and 7, where the rollers are mounted between flanges, so as to have each end supported. In this construction the inclosing-rim, which is screwed into the outer rim or case B, extends entirely across, and the flange, D, shown in the other construction is transferred to the inner rim. The use of these inner rims allows them to be removed when worn, and they are thus fitted for use in metallic pulleys. Fig. 8 shows a modification as applied to a metallic pulley.

In some cases more than two series of alternating rollers will be used where longer bearings are necessary; but such modifications will readily suggest themselves.

Having thus described my invention, what I claim as new, and desire to secure by Letters Patent, is—

1. An anti-friction bearing provided with two or more series of alternately-arranged rollers, each roller guided by central guide-pins, and bearing in rims or grooves in the bushing or box, substantially as described.

2. In an anti-friction bearing, a loose annulus interposed in the bushing between two adjacent sets of friction-rollers, as and for the purpose described.

3. The ring F, having the pins G projecting from opposite sides, each set alternating with those upon the opposite sides of the ring, for the purpose of retaining the rollers in their relative positions, substantially as herein described.

4. The annulus F, provided on its opposite sides with alternating guide-pins G, and the alternating friction-rollers E, in combination with the bushing B, constructed with lip D and flanges C C', forming intervening grooves, substantially as described.

5. The method of forming a steadying-center by having the plane of their faces projecting slightly beyond that of the pulleys, substantially as shown and described.

THOMAS HENRY KING.

Witnesses:
GEO. H. STRONG,
FRANK A. BROOKS.